Patented May 16, 1933

1,908,716

UNITED STATES PATENT OFFICE

FRANK M. WILLIAMS, OF WATERTOWN, NEW YORK

METHOD OF PRODUCING DRY SIZE

No Drawing.  Application filed April 26, 1930.  Serial No. 447,768.

This invention relates to sizing compositions and methods of preparing the same, and it has particular reference to water dispersible sizing composition produced directly from materials in the dry state and solid phase.

In a copending application, Serial No. 429,210, filed February 17, 1930, I have pointed out a number of factors involved in the manufacture and use of sizing compositions. I may here state that a sizing composition is a material employed to impart water repellent properties and ink bearing properties and to reduce the capillarity of the fibers in such materials as textile fabrics and paper. For sizing paper, it has heretofore been proposed to employ sodium resinate or a rosin soap, made by the action of a hot or cold alkaline solution on ordinary rosin, or by fusing together the alkali and the rosin. These products yield rosin soap or sodium resinate, which may be diluted with water, added to the paper stock, and subsequently precipitated on the fibers by the use of a suitable agent, such as alum or sulphuric acid.

As explained more fully in the aforesaid copending application of which the instant case may be regarded as a continuation in part, I have found that it is unnecessary, in the preparation of water-dispersible sizing material, to resort to the use of hot or cold alkaline solutions, or to the relatively high temperatures employed in fusion methods.

In accordance with the phases herein set forth and claimed, I treat the solid material in the solid phase, and at a temperature below its fusion point or softening point, while in the dry state, or substantially free from excess water, with a substance which is capable of being peptized and dispersed with water. The substance which I employ may be chemically non-reactive toward the sizing material, or may react therewith to form a reaction product or soap; or, I may use a material which, in accordance with the methods that I have developed, is inert when used in certain proportions, and which is chemically reactive when used in other proportions.

For a base or sizing material I may refer to colophony or ordinary rosin as a typical example. This material is insoluble in water in its natural form, and is not readily dispersible in such medium, even at elevated temperatures. By my method of treatment, however, I am able to produce a rosin size capable of forming a complete and permanent dispersion of rosin throughout an aqueous medium which is a substantially homogeneous, dispersed mixture of rosin, protected in its dispersed form, by the substances readily peptized by water, and which aid in the peptization of the rosin in the liquid or aqueous medium. Such dispersion will occur only subsequent to the intimate grinding, crushing, and inter-dispersion of one substance within the other, such as is contemplated by my improved process and not by a mere mixing action. As examples of substances, which when intimately intermixed with rosin, subsequently produce a dispersible rosin when ground minutely therewith, are starch, gelatin, alkaline casein, sodium silicate, sodium carbonate, and sodium hydroxide.

The method of preparing the dry sizing compound consists in pulverizing or grinding the natural rosin with a selective protective stabilizer, both substances being in the normally dry stage, that is, in the presence of only so large a quantity of water as may be present as hygroscopic moisture upon the surfaces of the dry substance, which quantity will be conditioned by the humidity of the surrounding atmosphere. For effectively producing finely divided and intimately inter-dispersed mixtures, the grinding is effected at temperatures considerably below the fusion point or softening point of the constituents of the mixture, that is to say, below about seventy degrees centigrade.

In the practical way of working, I employ a ball mill or pebble mill, and I grind the constituents which I desire to incorporate in my finished dry sizing mixture simultaneously, for reasons set forth hereinabove. I prefer to charge lumps or chunks of the raw materials, which are preferably larger than a quarter inch in size. During the grinding and pulverizing of these particles, air films surrounding them are eliminated and an intimate impregnation of one into the other is effected.

By employing a ball mill, pebble mill, rod mill or disc mill the continuous impact and rubbing action of the harder flinty pebbles, rods or discs upon the rosin and the protective stabilizer with which it is being ground, insure intimate contact of the finished and finely ground material. By the use of such a mill, I may work the process advantageously as a continuous one, but where conditions require, it can naturally be an intermittent process as well.

I have discovered that it is possible to make a rosin soap by intimately grinding, rubbing, and crushing together particles of rosin and a saponifying agent. When these substances are in a normally dry condition, or substantially dry, no chemical reaction occurs when the solid ingredients are mixed together. However, the finely divided and intimately interdispersed products of the saponifying agent and rosin, is to be distinguished from a mere mixture of these substances. During the crushing and grinding action the attrition of one particle upon another, the crushing and shearing action produced within the grinding mill, not only mix these various ingredients, but produce an intimate impregnation of one particle within the other. This friction and attrition produce sufficient local heating to insure a substantially complete chemical reaction between one molecule upon an adjacent molecule, yet without heating the mass. Such a result could not possibly be obtained by a mere mixing of the pulverized materials at room temperature.

I believe that I also effect another important result by means of this grinding and attrition, that is to say, where a gaseous envelope surrounds the various particles in the reacting mixture, the said envelope tends to prevent chemical reaction of the contiguous particles. During the crushing and grinding action, however, the gaseous film is destroyed and dispersed, or the tenacity with which it tends to surround the particle, so materially lessened, that chemical reaction will occur between the finely divided materials.

In one way of working, I ground together in the dry state one hundred parts of colophony resin of light yellow color with fifteen parts of dry sodium hydroxide. The resulting material was a dry powder consisting essentially of sodium resinate, prepared without recourse to high temperatures or alkaline solution. When dissolved in water to form a five per cent solution, there was obtained a clear tea colored liquid, which could be clarified and decolorized by the addition of alum.

In another way of working, I ground together in the dry state one hundred parts of rosin with forty parts of sodium carbonate to produce a dry powdered substance. Upon shaking the material up with water, I found that there was produced a turbid colored liquid producing a lather upon shaking, and containing no lumps or nodules of rosin. This dispersion looked very much like an ordinary soap solution. The dispersion could be clarified by the addition of an excess of alum solution. I prepared material in the same way using eighteen parts of sodium carbonate to one hundred parts of rosin and obtained an aqueous dispersion of rosin forming a lather on shaking and from which the dispersed rosin and saponified rosin could be precipitated by the addition of alum. It may be noted that when working with carbonate in this fashion, the addition of alum causes the liberation of noticeable quantities of carbon dioxide.

In another way of working, I ground together in the dry state one hundred parts of rosin with five parts of caustic alkali, and obtained from the product a water-dispersible sizing composition which was opaque and white in color. From this it will be appreciated that, because of the method employed, I may prevent the natural reaction of soap formation, while converting the normally insoluble rosin into a dispersible condition. This procedure is advantageous in sizing paper, as it permits of the admixture of the size and the pulp without the use of large amounts of coagulating agents, such as alum, which, when carried into the finished paper, are subsequently extracted by water or moisture to render the paper more permeable and less water repellent.

In still another way of practicing the invention, I ground together in the dry condition one hundred parts of rosin and ten parts of "soluble" starch. The resulting product was transferred into a water-soluble material, and, when a slight amount of alkali was added, the dispersion could be clarified with alum solution.

From the foregoing illustrative examples, it will be appreciated by those skilled in the art, that it is not necessary to resort to chemical reactions involving the use of solutions or high temperatures in the conversion of a normally insoluble sizing material into a dispersed and usable form. Satisfactory results may be obtained by applying, to the surfaces of finely divided particles of the solid material, a colloidal film of some substance which serves as a surface tension reducing agent or peptizer so that, when the dry material is taken up in water, a dispersion of the minute sizing particles can be obtained. If desired, rosin soap of high quality may be made according to the method by employing a saponifying agent in such proportions as to effect the desired chemical reaction.

What I claim is:—

1. The method of making rosin sizing dispersible in cold water to form a size, including substantial proportions of rosin soap, which comprises grinding and intimately inter-dispersing normally water-insoluble and non-dispersible rosin with a saponifying agent at a temperature below the softening point of rosin.

2. The method of making rosin sizing dispersible in cold water to form a size including substantial proportions of reaction product of rosin, which comprises grinding normally water-insoluble and non-dispersible rosin with soda ash at a temperature below the softening point of rosin, the proportion of the agent to the rosin being equivalent chemically to a substantial proportion of the rosin.

3. The method of making rosin size which comprises intimately grinding finely divided normal rosin in the solid state with a substance chemically reactive toward the rosin and at a temperature below 70° C., the ground mixture being characterized in that it is dispersible in cold water.

4. The method of making rosin soap suitable for paper sizing which comprises grinding together normally water-insoluble and non-dispersible rosin and caustic alkali at a temperature below 70° C., the amount of alkali being sufficient to form a reaction product of rosin which, in aqueous mixtures containing more than about five per cent dry matter, produces a turbid amber colored liquid mass.

5. The method of making a water-soluble rosin size from normally insoluble and non-dispersible rosin which comprises pulverizing and grinding together such rosin at a temperature below its softening point and in the solid condition with a quantity of caustic alkali sufficient to form a water-soluble rosin soap yielding, on admixture with water, an amber colored liquid.

6. The method of making a water-soluble rosin soap from normally insoluble and non-dispersible rosin which comprises pulverizing such rosin in the absence of free water at a temperature below its softening point and in the solid condition with a quantity of dry saponifying agent.

FRANK M. WILLIAMS.